US007750772B2

(12) United States Patent
Hagen et al.

(10) Patent No.: US 7,750,772 B2
(45) Date of Patent: Jul. 6, 2010

(54) ELECTROMAGNETIC DRIVE DEVICE

(75) Inventors: Jörg Hagen, Berlin (DE); Carsten Protze, Dresden (DE)

(73) Assignee: Siemens Aktiengesellschaft, Munich (DE)

( * ) Notice: Subject to any disclaimer, the term of this patent is extended or adjusted under 35 U.S.C. 154(b) by 100 days.

(21) Appl. No.: 11/916,370

(22) PCT Filed: May 9, 2006

(86) PCT No.: PCT/EP2006/062141

§ 371 (c)(1),
(2), (4) Date: Dec. 3, 2007

(87) PCT Pub. No.: WO2006/128775

PCT Pub. Date: Dec. 7, 2006

(65) Prior Publication Data

US 2008/0186118 A1 Aug. 7, 2008

(30) Foreign Application Priority Data

Jun. 3, 2005 (DE) ....................... 10 2005 026 415

(51) Int. Cl.
*H01F 3/00* (2006.01)
*H01F 7/08* (2006.01)
*H01F 7/12* (2006.01)
*F16K 31/02* (2006.01)

(52) U.S. Cl. ....................... 335/279; 335/220; 335/249; 335/261; 251/129.16

(58) Field of Classification Search .................. 335/55, 335/80, 95, 124, 131, 144, 184, 203, 220, 335/233, 235, 249, 251, 253, 255, 256, 258, 335/261, 269, 270, 272, 273, 279; 251/54, 251/129.1, 129.16; 310/12
See application file for complete search history.

(56) References Cited

U.S. PATENT DOCUMENTS

| | | | | |
|---|---|---|---|---|
| 1,817,592 | A * | 8/1931 | Sokoloff | 335/259 |
| 4,093,931 | A * | 6/1978 | Fenton | 335/272 |
| 4,429,342 | A * | 1/1984 | Heider | 361/152 |
| 4,673,163 | A | 6/1987 | Kushida et al. | |
| 5,223,812 | A | 6/1993 | Kreuter | |
| 5,269,269 | A * | 12/1993 | Kreuter | 123/90.11 |
| 5,903,204 | A * | 5/1999 | Schmitz et al. | 335/227 |
| 6,125,803 | A * | 10/2000 | Hattori et al. | 123/90.11 |
| 6,308,667 | B1 * | 10/2001 | Tsai et al. | 123/90.11 |
| 6,377,146 | B1 * | 4/2002 | Batteux | 335/280 |
| 6,737,946 | B2 * | 5/2004 | Seale et al. | 335/279 |
| 2004/0155215 | A1 * | 8/2004 | Kill et al. | 251/129.21 |
| 2008/0136266 | A1 * | 6/2008 | Protze | 310/12 |

FOREIGN PATENT DOCUMENTS

| | | |
|---|---|---|
| DE | 36 00 499 A1 | 7/1986 |
| DE | 297 15 900 U1 | 11/1997 |
| JP | 02076206 | 3/1990 |
| JP | 2000195719 | 7/2000 |
| JP | 2003017316 | 1/2003 |

* cited by examiner

*Primary Examiner*—Elvin G Enad
*Assistant Examiner*—Mohamad A Musleh
(74) *Attorney, Agent, or Firm*—Larence A. Greenberg; Werner H. Stemer; Ralph E. Locher

(57) ABSTRACT

An electromagnetic drive system contains an armature that can be displaced along an axis. The armature contains a piston-shaped section. The piston-shaped section is guided in a cylindrical section of the stator. A recess extends through the piston-shaped section substantially in the direction of the axis. The incorporation of the recess results in that a fluid cushion that builds up in front of the piston-shaped section during rapid movement can be relieved through the piston-shaped section.

7 Claims, 3 Drawing Sheets

ELECTROMAGNETIC DRIVE DEVICE

BACKGROUND OF THE INVENTION

Field of the Invention

The invention relates to an electromagnetic drive device having an armature which can be moved along an axis and has a section which is in the form of a piston and can be moved in a cylindrical section of a stator.

One such electromagnetic drive device is known, for example, from utility model DE 297 15 900 U1. This document describes an electromagnetic drive device which is used to initiate a switching operation for a circuit breaker. For this purpose, the electromagnetic drive device has a stator with an electrical winding into which an armature moves when current flows through the winding. The armature has a section which is in the form of a piston and can be moved in a cylindrical section of the stator. The mass of the armature can be varied in order to adjust the response time of the armature.

When the mass of the armature of the electromagnetic drive device is increased, the overall system becomes more inert, resulting in a delay in the response of the drive device.

BRIEF SUMMARY OF THE INVENTION

The invention is based on the object of designing an electromagnetic drive device of the type mentioned initially so as to ensure rapid response with precise movement of the armature.

According to the invention, in the case of an electromagnetic drive device of the type mentioned initially, the object is achieved in that at least one recess, which runs essentially in the same direction as the axis, passes through the section which is in the form of a piston.

The incorporation of a recess means that a fluid cushion which builds up in front of the section that is in the form of a piston during rapid movement can be relieved through the section which is in the form of a piston. Fluids at an increased pressure such as gases or liquids can pass quickly through the section which is in the form of a piston, via the recess. In this case, the recess, which runs in the same direction as the axis, may have various shapes. For example, linear channels may be provided, or else channels which are at an angle in the section which is in the form of a piston may be used. Furthermore, further configurations may also be used, such as spiral recesses, meandering recesses, etc. All the recesses have the common feature that inlet and outlet openings are provided respectively in front of and behind the section which is in the form of a piston, in the direction of the axis, in order to pass a gas flow or a liquid flow quickly through the section which is in the form of a piston. Particularly when the section which is in the form of a piston is moved in a closed area, this avoids the build up of a fluid cushion in the movement apparatus, in front of the section which is in the form of a piston. In order to ensure that the armature is guided as precisely as possible in the stator, the armature slides within the cylindrical section of the stator. In this case, there is no need to provide a special seal between the stator and the armature. Even small gaps between the section which is in the form of a piston and the cylindrical section are sufficient to prevent fluids from passing through the gap between the section which is in the form of a piston and the cylindrical section.

In this case, one advantageous refinement makes it possible to provide for the recess to pass through an edge, facing the cylindrical section, of the section which is in the form of a piston.

By way of example, a recess incorporated in the edge of the section which is in the form of a piston may be a notch or a groove, which deliberately forms a channel between the section which is in the form of a piston and the cylindrical section, in order to allow gases or liquids to pass through during movement of the armature. In this case, the recess may have various profiles. For example, the groove may be in the form of a dovetail, in the form of a slot, rectangle, V-shape, or may have any other desired shapes.

Irrespective of the position of the recess in the edge area or else surrounded by the section which is in the form of a piston, the following measures may be provided. In order to allow the fluid flow passing through during movement to be controlled more specifically, it is also possible to provide, for example, for the recess to be provided with a specific profile. It is thus possible to deliberately provide sections of the recess with a greater or lesser resistance to the flow. Furthermore, the volume of the fluid passing through during movement of the armature can be influenced deliberately by the recess adopting a specific route, for example in a spiral shape around the section which is in the form of a piston. For example, this means that it is possible for a large amount of fluid to first of all pass through the entire overflow channel, which is formed by the recess, during movement, with a build-up wave being created in the recess as the movement progresses, and providing a restriction to further fluid passing through. This makes it possible, for example, to assist compliance with a specific armature movement profile.

It is advantageously also possible to provide for the recess to be a slot which is aligned essentially radially with respect to the axis.

A slot which is aligned radially with respect to the axis is advantageously suitable not only for steering and guiding a fluid flow but also to prevent the formation of eddy currents in the armature when current flows through the stator. The magnetic fields which occur in an electromagnetic drive device result in forces being produced between an armature and a stator. The fixed-position stator normally has an electrical winding for this purpose, to which a current can be applied. The current that is flowing forms a magnetic field in the interior of the winding. The armature which, for example, is formed from a ferromagnetic material is caused to move by the magnetic field. Eddy currents are induced in the armature as it is moved into a magnetic field. These eddy currents lead to heating of the armature and result in a reduction in the electromagnetic force acting on the armature. The introduction of at least one slot which is aligned radially with respect to the axis interrupts potential eddy-current paths. In this case, it is possible to provide for a plurality of slots to be incorporated in the armature, in the radial direction with respect to the axis. In this case, the slots may have different shapes. For example, they may be surrounded by the armature or may extend through the edge of the armature in the direction of the axis. This can be achieved, for example, by sawing or milling into the edge area of the armature.

A further advantageous refinement can be used to provide a conical attachment adjacent to the section which is in the form of a piston.

A conical attachment adjacent to the section which is in the form of a piston allows magnetic lines of force to be guided advantageously in the interior of the armature. Magnetic lines of force which cross over from the stator into the armature can therefore be guided in a simple manner such that the magnetic lines of force emerge from the surface, or enter the surface, as far as possible at right angles to the boundary surfaces. This is advantageous since only the normal components of the magnetic lines of force are effective in producing a force on the armature. For example, the section which is in the form of a piston may be arranged at the bottom of a cone.

A further advantageous refinement makes it possible to provide in this case for a stepped attachment in the form of a disk stack to be adjacent to the section which is in the form of a piston.

The stepped refinement of the attachment likewise has good characteristics for guidance of the magnetic lines of force. It is therefore possible to deliberately form pole surfaces in which the magnetic lines of force are guided in a concentrated form. In the case of rectangular steps, for example, these are the annular surfaces which are arranged coaxially with respect to the axis. The surfaces, of the stepped attachment, which are in the form of cylindrical casings and likewise extend coaxially around the axis, are very largely free of magnetic lines of force passing through them.

In addition to the rectangular configuration of the steps, it is also possible to use stepped sawtooth arrangements or further suitable profiles for the attachment.

Both stepped and conical attachments may be formed integrally with the section which is in the form of a piston. However, it is also possible for both the attachment itself and the armature to be formed from a plurality of parts.

The conical attachment or the stepped attached also provides advantageous flow conditions in order to move the armature quickly through a fluid and to guide the gas or liquid volume to be displaced past the piston or through the piston.

Furthermore, tapering attachments are suitable for ensuring that the armature is centered while current is passing through the stator. An attachment such as this makes it possible for the electromagnetic drive device to produce large holding forces.

It is advantageously possible to provide for the attachment to be hollow.

On the one hand, a hollow recess reduces the mass of the armature to be moved. This reduces the inertia of the moving parts and ensures rapid response of the armature. Furthermore, the walls of the hollow body can be used to deliberately guide the magnetic lines of force.

By way of example, in order to form the wall, it is advantageously possible for the hollow attachment to have a reducing circumference in the direction of the axis, and for a wall of the hollow attachment to have a thickness which decreases as the circumference becomes increasingly smaller.

A reduction in the wall of the hollow attachment in the direction of the thin tip of the attachment allows the magnetic lines of force that are guided within the armature to be distributed advantageously. The magnetic lines of force which are produced in the interior of the electrical winding can pass via appropriate pole shoes on the stator into a large volume on the section which is in the form of a piston. In this case, it is advantageous for the section which is in the form of a piston to be cylindrical or hollow-cylindrical and to be as close as possible to the cylindrical section of the stator. This allows the magnetic lines of force to cross over from the stator into the armature, and vice versa, with losses that are as small as possible. As the wall thickness of the hollow attachment decreases, the magnetic reluctance of the wall becomes greater. In consequence, the magnetic lines of force are distributed over a large area on the outer casing surface (the inlet or outlet surface) of the attachment. This results in the magnetic flux passing uniformly through the armature. A uniform flux density of the magnetic field allows the electromagnetic drive device to emit a correspondingly high power. Furthermore, a high holding force is also ensured, at least in one of the limit positions of the movable armature.

By way of example, one advantageous refinement makes it possible to provide for a surface which is essentially at right angles to the axis to be formed as an end stop on the armature.

The perpendicular stops make it possible to use comparatively small surfaces as a stop surface. The casing surfaces which are required to produce and guide the magnetic lines of force can be kept deliberately at a distance from boundary surfaces of the stator. This results in damage to the inlet and outlet surfaces, which are provided with a high surface quality, for the magnetic lines of force. By way of example, circular or annular surfaces are suitable for use as an end stop. The inclined armature and stator surfaces do not touch. This virtually precludes the risk of mechanical welding of these surfaces. It is also possible to provide a plurality of boundary surfaces which jointly act as an end stop. These may also be associated with different limit positions.

One advantageous refinement makes it possible to provide for the conical attachment to have a truncated-conical tip, which acts as an end stop.

A truncated-conical tip on the conical attachment allows contact forces to be introduced well into the conical attachment, and into the entire armature. This makes it possible to prevent delamination and deformation.

One advantageous refinement makes it possible to provide for a casing surface of the attachment to be at a distance from boundary surfaces of the stator when the armature is in its limit positions.

Casing surfaces of the attachment, that is to say of the cone casing and the stepped casing surface, should be at a distance from the boundary surfaces of the stator in order to preclude damage to the sensitive surfaces. For example, if the attachment has a conical shape, it is possible to provide for just one truncated-conical tip to make contact with a boundary surface of the stator and for the conical casing surface to be at a distance from the boundary surfaces of the stator. The distances should in this case be sufficiently short that magnetic lines of force crossing over have their profile interfered with only to a minor extent. If the attachment has a stepped configuration, it is possible to provide for only specific surface sections to come into contact with the boundary surfaces of the stator, and for other surface sections to be at a distance from the boundary surfaces of the stator. If the attachment is designed to be rotationally symmetrical with rectangular steps, it is possible, for example, for the annular disks which are coaxial with respect to the axis to rest on boundary surfaces of the stator. These touching surfaces allow the magnetic lines of force to be guided with low reluctance. In contrast to this, the cylindrical casing surfaces which are arranged coaxially with respect to the axis should be arranged at a distance from the corresponding boundary surfaces of the stator in order to deliberately guide the magnetic lines of force into the mutually touching surfaces.

Exemplary embodiments of the invention will be described in more detail in the following text and are illustrated schematically in the figures, in which:

DESCRIPTION OF THE INVENTION

Figure 1:
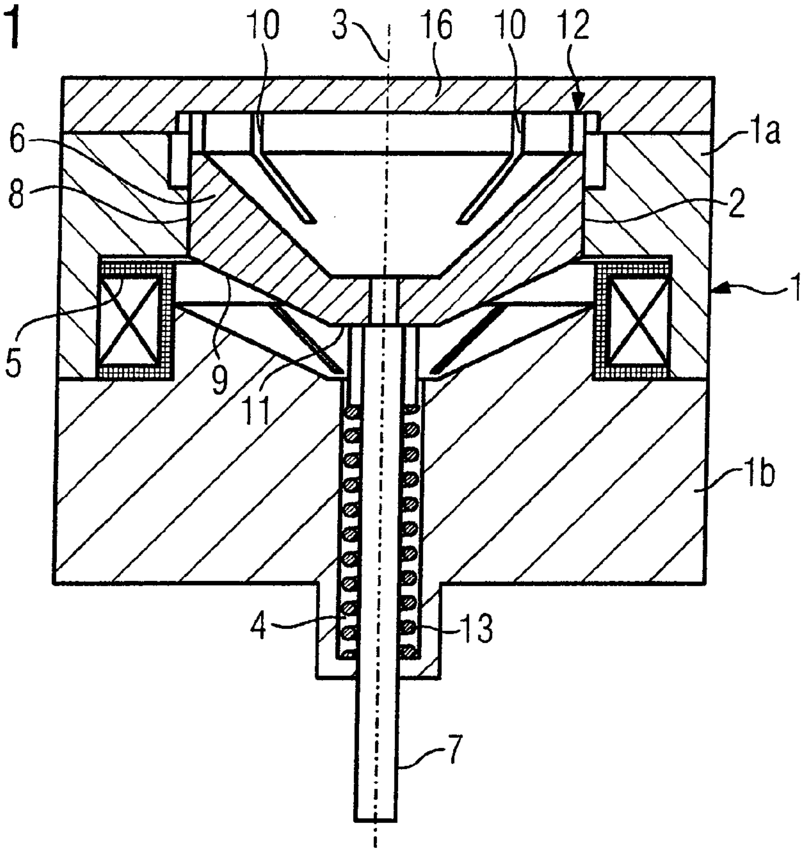
FIG. 1 shows a first embodiment variant of an electromagnetic drive device in its rest position.
Figure 4:
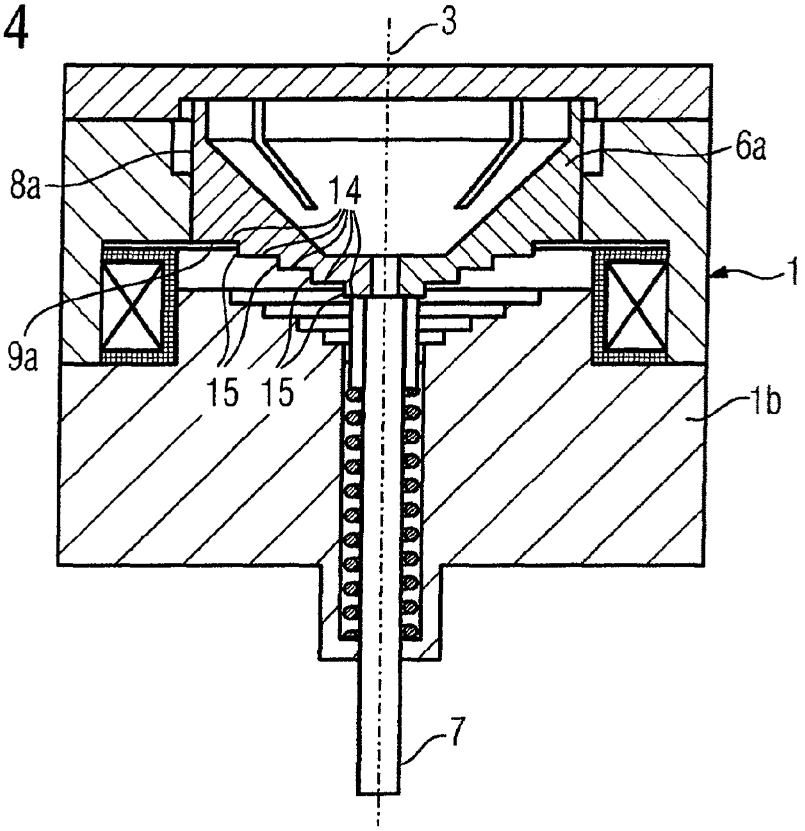
FIG. 4 shows a second embodiment variant of an electromagnetic drive device with a stepped attachment in the form of a disk stack on a section, which is in the form of a piston, of the armature.
Figure 5:
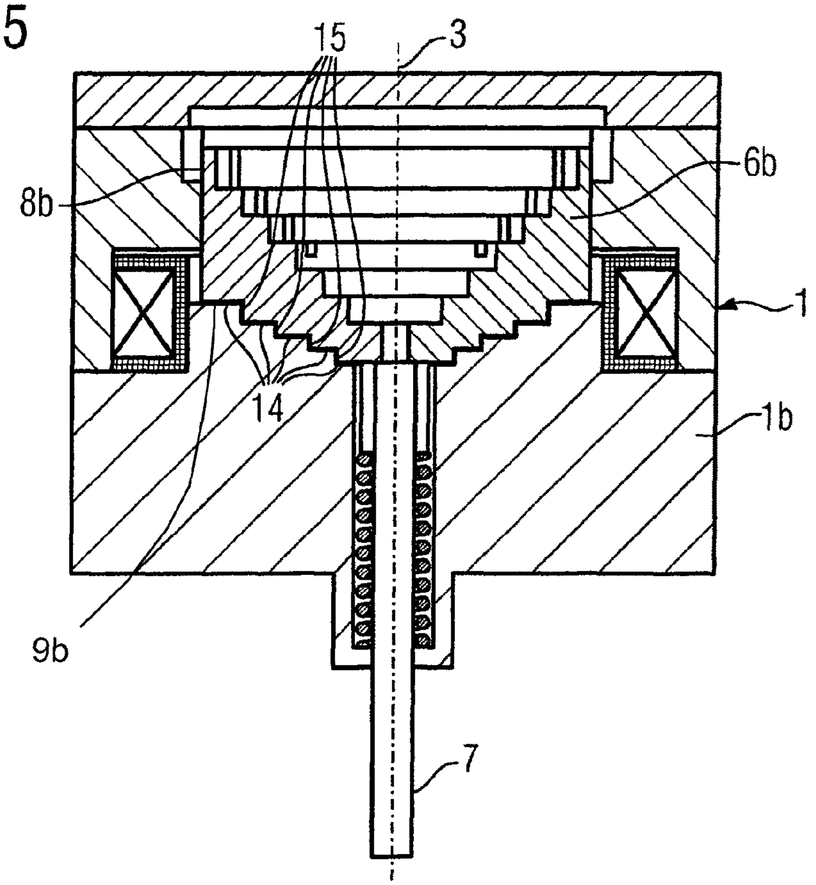
FIG. 5 shows a third embodiment variant of an electromagnetic drive device with an alternative configuration of a stepped attachment in the form of a disk stack on a section, which is in the form of a piston, of the armature.

By way of example, the basic design of an electromagnetic drive device according to the invention will be explained first of all with reference to FIG. 1. The embodiment variants illustrated in FIGS. 4 and 5 are in principle designed identically, but have differences relating to the configuration of the armature.

The first embodiment variant of the drive device has a stator 1. The stator 1 is composed of a first part 1*a* and a second part 1*b*. The first part 1*a* has a cylindrical section 2. The cylindrical section 2 has a circular cross section. The cylindrical section 2 is arranged coaxially with respect to an axis 3. The second part 1*b* of the stator 1 has a channel 4, which is located coaxially with respect to the axis 3, and has a circular cross section. The first part 1*a* and the second part 1*b* of the stator are connected to one another so as to form a compact body which guides magnetic lines of force. A winding through which current can flow and which has an iron core 5 is inserted into an annular gap, which is formed in the joint area between the first part 1*a* and the second part 1*b*, in the stator 1. The winding with the iron core 5 is arranged coaxially with respect to the axis 3.

A section 8 of the armature 6, which is in the form of a piston and has a circular cross section, is guided in the cylindrical section 2 of the stator 1. The armature 6 has a drive rod 7, which is likewise arranged coaxially with respect to the axis 3 and is guided in the channel 4. There is a conical attachment 9 adjacent to the section 8 which is in the form of a piston of the armature 6. The section 8 which is in the form of a piston and the conical attachment 9 are in the form of an integral body. However, it is possible to provide for separate body elements to be used for the section 8 which is in the form of a piston and for the conical attachment 9. The conical attachment 9 and the section 8 which is in the form of a piston of the armature 6 are in the form of hollow bodies. As can be seen from the section view in FIG. 1, the wall thickness is in this case chosen such that the wall thickness decreases as the circumference of the conical attachment 9 decreases. In order to prevent eddy currents and to allow gas to pass through, recesses 10 which are in the form of slots and are aligned radially are incorporated in the armature 6. The recesses 10 which are in the form of slots may in this case be incorporated sufficiently deeply that they extend into the conical attachment 9. The recesses 10 are in this case located radially with respect to the axis 3, and pass through the edge of the section 8 which is in the form of a piston.

Figure 2:
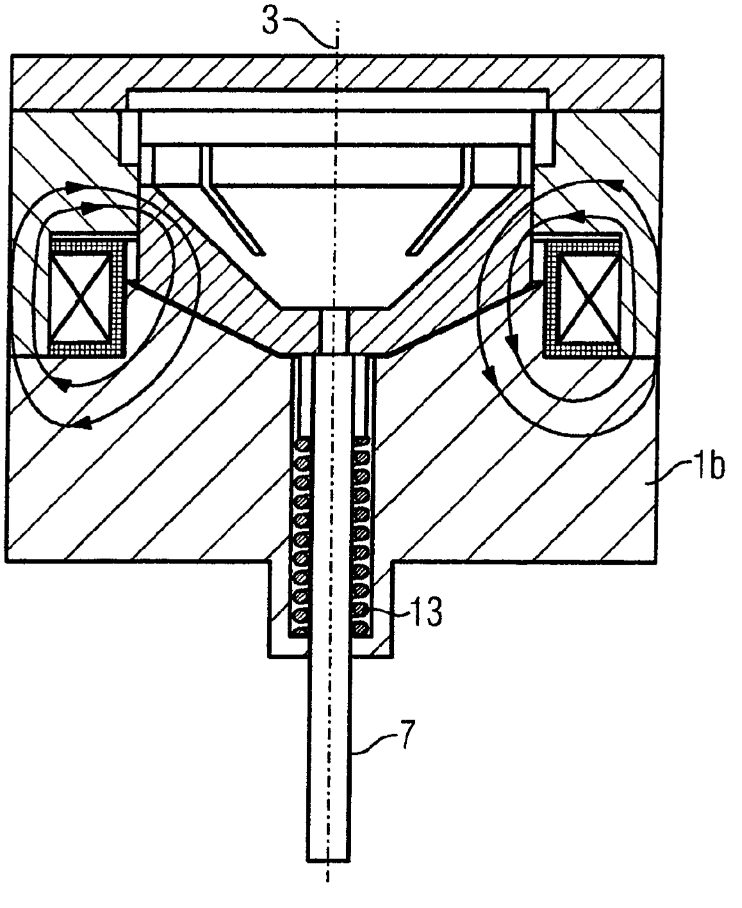
FIG. 2 shows the first embodiment variant of an electromagnetic drive device in its switched-on position.

On the side facing the drive rod 7, the conical attachment 9 has a truncated-conical flattened area. This results in the formation of an annular surface 11 which extends around the drive rod 7. The annular surface 11 is used as an end stop for the armature 6. An annular surface 12 is formed in the bottom area of the section 8, which is in the form of a piston, on the side of the armature 6 facing away from the drive rod 7. The annular surface 12 likewise acts as an end stop. In the rest state, the circular surface 12 at the bottom of the armature 6 presses against a plate 16 which closes the cylindrical section 2. When the first embodiment variant of an electromagnetic drive device is in the rest state as shown in FIG. 1, the armature 6 is separated from the second part 1*b* of the stator 1 by a helical spring 13 which extends around the drive rod 7 within the channel 4. The armature 6 is held in its limit position via the annular surface 12 at the end of the armature 6 facing away from the drive rod 7. When current flows through the winding with the iron core 5, a magnetic field is formed which extends in the first part 1*a* and in the second part 1*b* of the stator, and is guided within the stator 1. The magnetic lines of force emerge from the first part 1*a* in the area of the cylindrical section 2, and enter a wall of the hollow armature 6, preferably in the area of the section 8 which is in the form of a piston. As a result of the decreasing wall thickness in the direction of the tip of the armature 6, the lines of force are distributed uniformly over the conical casing surface of the conical attachment 9. The intrinsically closed lines of force attempt to shorten their path, as a result of which the lines of force emerge from the surface of the armature 6 and enter the second part 1*b* of the stator 1. The armature is moved in the direction of the second part 1*b* by the force which is now created. By way of example, a number of magnetic lines of force are illustrated for the first embodiment variant of an electromagnetic drive device in the switched-on position (FIG. 2). Magnetic lines of force emerge at right angles from boundary surfaces of a ferromagnetic material. As can be seen in FIG. 2, the magnetic lines of force pass virtually at right angles through the boundary layer on the boundary surfaces in the area of the section 8, which is in the form of a piston, and in the area of the boundary surfaces of the casing surface of the conical attachment 9. In consequence, a large proportion of the lines of force adjacent to these boundary layers become normal components, producing a high holding force. The holding force counteracts the spring 13, which is loaded when in the switched-on state. When subjected to a current 4, the spring 13 drives the drive rod 7 together with the armature 6 back to the position shown in FIG. 1.

The drive rod 7 can carry out work during movement of the armature 6. For example, a holding catch of the drive of an electrical switching device, for example of a high-voltage circuit breaker, can be caused to break down, therefore initiating a switching process.

When the first embodiment variant of an electromagnetic drive device is in the switched-on position as illustrated in FIG. 2, the annular surface 11 which extends around the drive rod 7 rests on the second part 1*b*. The surface, which is designed in the same way but opposite, to the conical attachment 9 on the second part 1*b* of the stator 1 is in this case designed such that it is located approximately parallel to the casing surface of the conical attachment 9, but there is no direct contact between these two surfaces. This prevents damage to the surface of the conical attachment 9.

Figure 3:
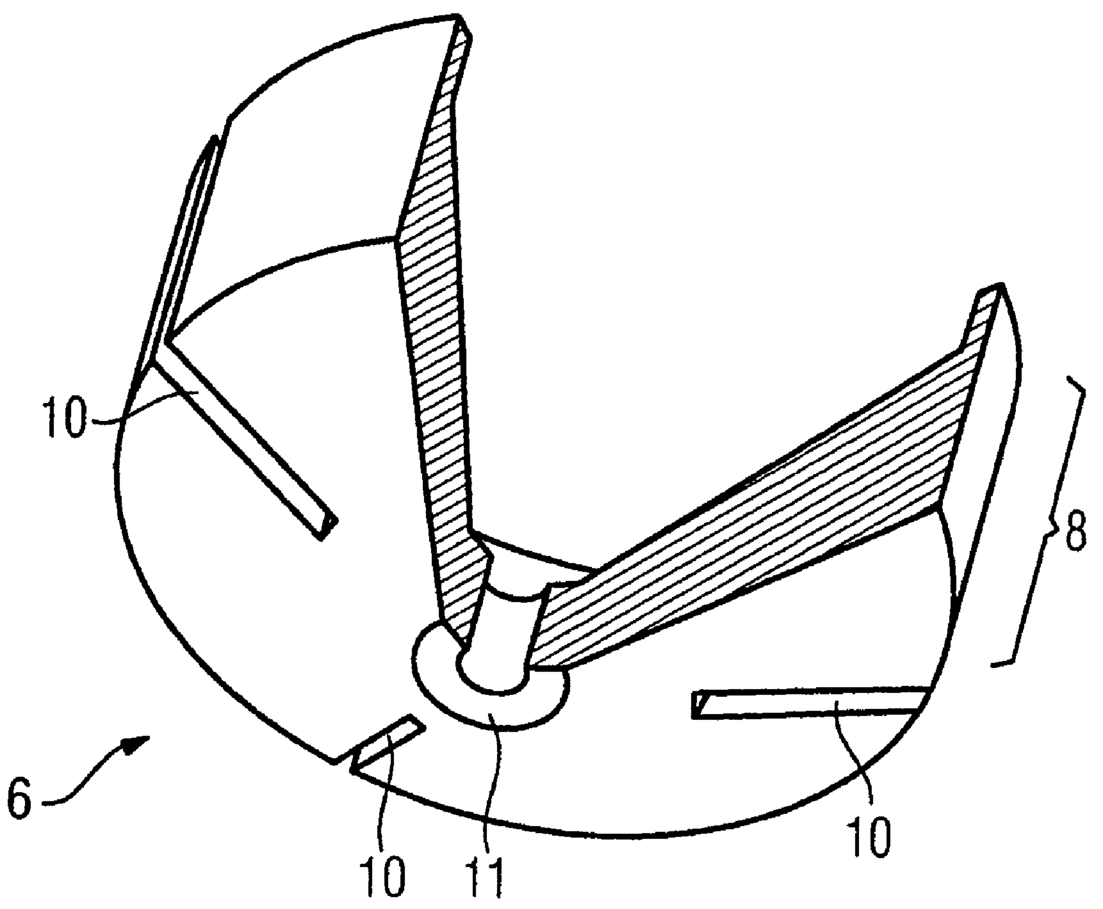
FIG. 3 shows a perspective view, cut away in places, of the armature shown in FIGS. 1 and 2.

FIG. 3 shows, in perspective, the configuration of the armature 6, although the drive rod 7 is not shown. The figure shows the section 8, which is in the form of a piston, the annular surface 11 which surrounds the drive rod 7, and a plurality of recesses 10 which are in the form of slots and which pass radially through the section 8, which is in the form of a piston.

As an alternative to the embodiment of the armature shown in FIG. 3, it is also possible to use other armatures. FIGS. 4 and 5 show fundamental embodiment variants relating to this. FIG. 4 shows a second variant of an electromagnetic drive device. The electromagnetic drive device is illustrated in its rest position and has the same fundamental design and operates in the same way as the first embodiment variant, as illustrated in FIGS. 1 and 2, of an electromagnetic drive device. The different configuration of the armature 6*a* will now be described with reference to FIG. 4. Adjacent to its section 8*a* which is in the form of a piston, the armature 6*a* has a stepped attachment 9*a* in the form of a disk stack. The stepped configuration results in the circumference of the attachment 9*a* becoming increasingly smaller in the direction of the drive rod 7. The stepped attachment also has a rotationally symmetrical form, with the axis of rotation corresponding to the axis 3. The armature 6*a* is likewise hollow, with the surface which bounds the cavity also being conical. This ensures that the wall thickness decreases in the direction of the drive rod 7 of the armature 6*a*, thus resulting in the magnetic lines of force being distributed uniformly over the surface of the stepped attachment 9*a*. A boundary surface which is the same but opposite, and is stepped, is formed on the second part 1*b* of the stator 1.

FIG. 5 shows a third embodiment variant of an electromagnetic drive device in its switched-on position. The third embodiment variant of the electromagnetic drive device has an armature 6*b* with a section 8*b* which is in the form of a piston and adjacent to which there is a stepped attachment 9*a* in the form of a disk stack. The armature 6*b* in the third embodiment variant of an electromagnetic drive device is once again hollow, with the surface of the stepped attachment facing the cavity being stepped. Once again, this ensures that the wall thickness of the hollow attachment decreases in the direction of the drive rod 7.

In the embodiment variants of an electromagnetic drive device as shown in FIGS. 4 and 5, surfaces 14, which are in the form of circular disks, of the armature 6*a*, 6*b* are in each case used as end stops. The surfaces 15, which are in the form of cylindrical casings, are each arranged at a distance from the boundary surfaces, which are the same but opposite, of the stator 1. Air gaps are once again formed deliberately in these areas when in the switched-on position, and surround the axis 3 in the form of a hollow cylinder. As a result of magnetic reluctance conditions that are formed in this way, the magnetic lines of force are forced to enter the second part 1*b* of the stator 1 from the attachment 9*a*, 9*b* through the annular surfaces 14. This ensures that, in this case as well, the magnetic lines of force are always passed from the stator 1 into armature 6*a*, 6*b* at right angles, and vice versa. This results in large holding forces and high attraction forces.

The invention claimed is:

1. An electromagnetic drive device, comprising:

a stator having a cylindrical section and an axis; and an armature movable along said axis and having a section being in a form of a piston and being moved in said cylindrical section of said stator, said section having at least one recess formed therein and running generally in a same direction as said axis, said recess passing through said section and said recess extending over an entire length of said section in said direction of said axis said armature having a conical attachment adjacent to said section, said conical attachment being a hollow attachment, said hollow attachment having a reducing circumference in a direction of said axis, and said hollow attachment having a wall with a thickness decreasing as a circumference becomes increasingly smaller.

2. The electromagnetic drive device according to claim 1, wherein said recess passes through an edge, facing said cylindrical section, of said section in said form of said piston.

3. The electromagnetic drive device according to claim 1, wherein said recess is a slot aligned generally radially with respect to said axis.

4. The electromagnetic drive device according to claim 1, wherein said armature has a surface being generally at right angles to said axis and forming an end stop of said armature.

5. The electromagnetic drive device according to claim 1, wherein said conical attachment has a truncated-conical tip acting as an end stop.

6. The electromagnetic drive device according to claim 1, wherein said conical attachment has a casing surface and is at a distance from boundary surfaces of said stator when said armature is in its limit positions.

7. An electromagnetic drive device, comprising: a stator having a cylindrical section and an axis; and an armature movable along said axis and having a section being in a form of a piston and being moved in said cylindrical section of said stator, said section having at least one recess formed therein and running generally in a same direction as said axis, said recess passing through said section and said recess extending over an entire length of said section in said direction of said axis, said armature having a stepped attachment in a form of a disk stack adjacent to said section, said stepped attachment being a hollow attachment, said hollow attachment having a reducing circumference in a direction of said axis, and said hollow attachment having a wall with a thickness decreasing as a circumference becomes increasingly smaller.

* * * * *